(No Model.) 7 Sheets—Sheet 1.
P. BUTLER.
CARTRIDGE MACHINE.

No. 495,959. Patented Apr. 25, 1893.

Witnesses
Wm. S. Brown
N. P. Ockington

Inventor
Paul Butler
By David Hall Rice
Atty (No Model.) 7 Sheets—Sheet 3.
P. BUTLER.
CARTRIDGE MACHINE.

No. 495,959. Patented Apr. 25, 1893.

Witnesses
Wm. S. Brown
N. P. Ockington

Inventor
Paul Butler
By David Hall Rice
Atty (No Model.) 7 Sheets—Sheet 4.
P. BUTLER.
CARTRIDGE MACHINE.

No. 495,959. Patented Apr. 25, 1893.

(No Model.) 7 Sheets—Sheet 6.
P. BUTLER.
CARTRIDGE MACHINE.

No. 495,959. Patented Apr. 25, 1893.

(No Model.) 7 Sheets—Sheet 7.
P. BUTLER.
CARTRIDGE MACHINE.
No. 495,959. Patented Apr. 25, 1893.
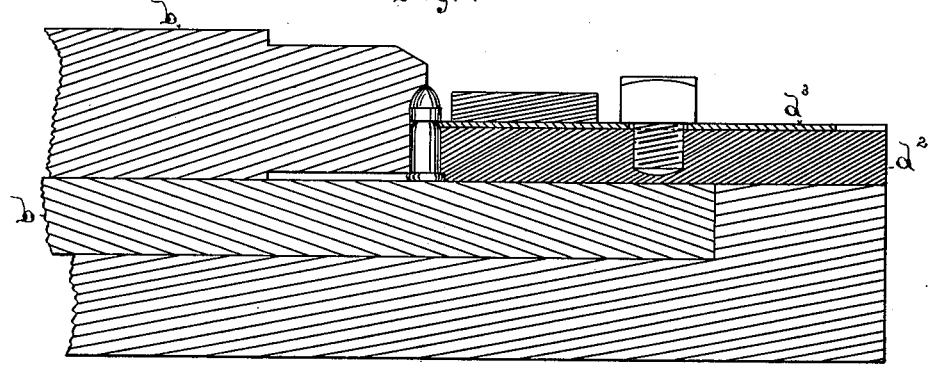
Fig. 7
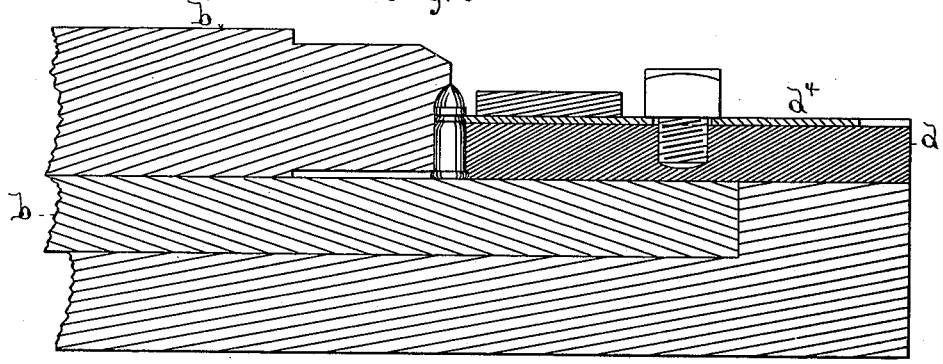
Fig. 8
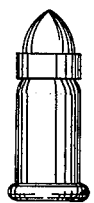 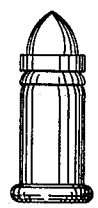
Fig. 9  Fig. 10
Witnesses
Wm S. Brown
N. P. Ockington
Inventor
Paul Butler
By David Hall Rice
Atty.

UNITED STATES PATENT OFFICE.

PAUL BUTLER, OF LOWELL, MASSACHUSETTS.

CARTRIDGE-MACHINE.

SPECIFICATION forming part of Letters Patent No. 495,959, dated April 25, 1893.

Application filed February 12, 1887. Serial No. 227,353. (No model.)

*To all whom it may concern:*

Be it known that I, PAUL BUTLER, of Lowell, in the county of Middlesex and State of Massachusetts, have invented a new and useful Improvement in Cartridge-Machines, of which the following is a specification.

My improvement relates to machines for making up cartridges and it consists in certain new and useful constructions and combinations of the several parts thereof, substantially as hereinafter described and claimed.

Figure 1:
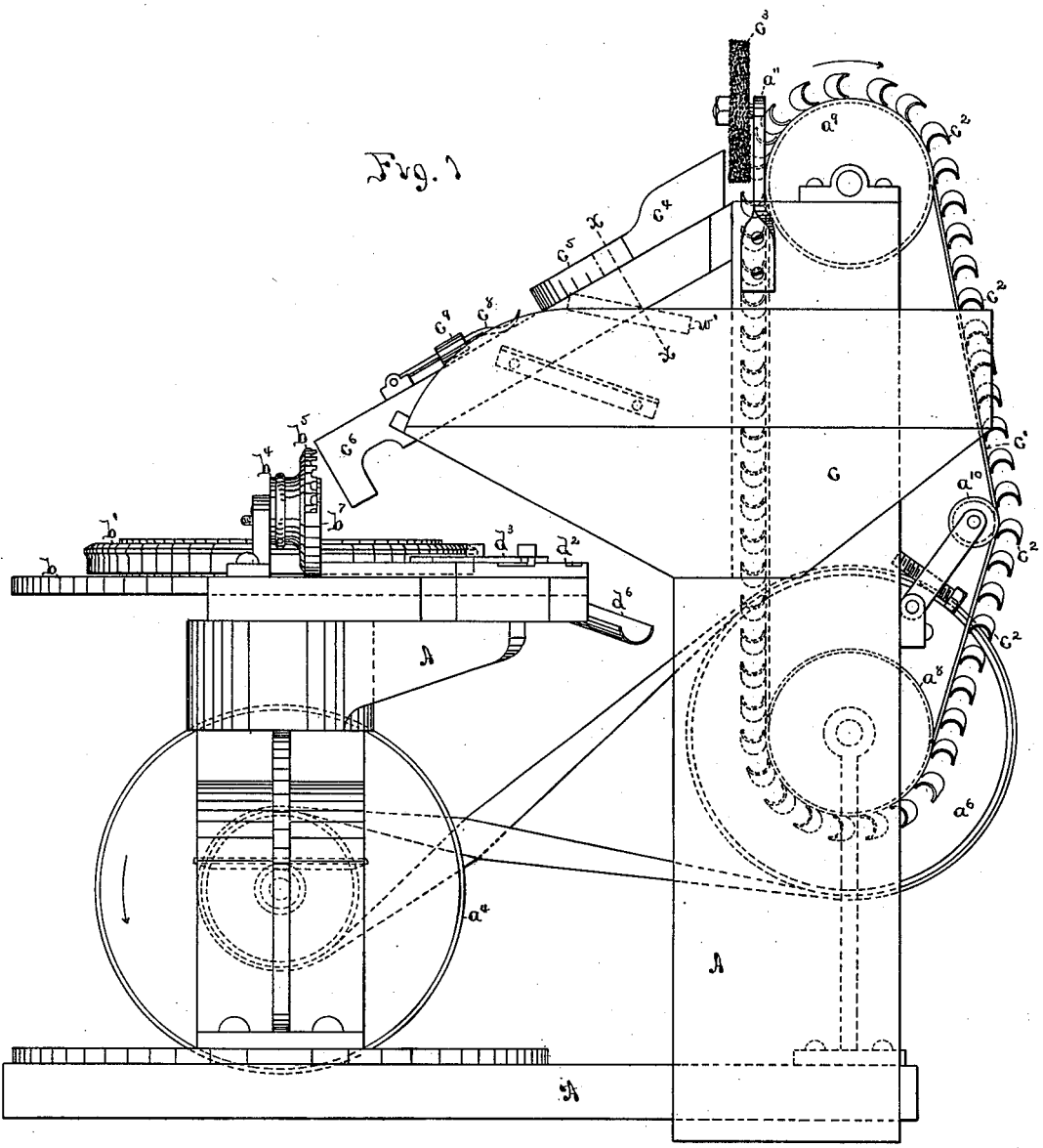
Figure 2:
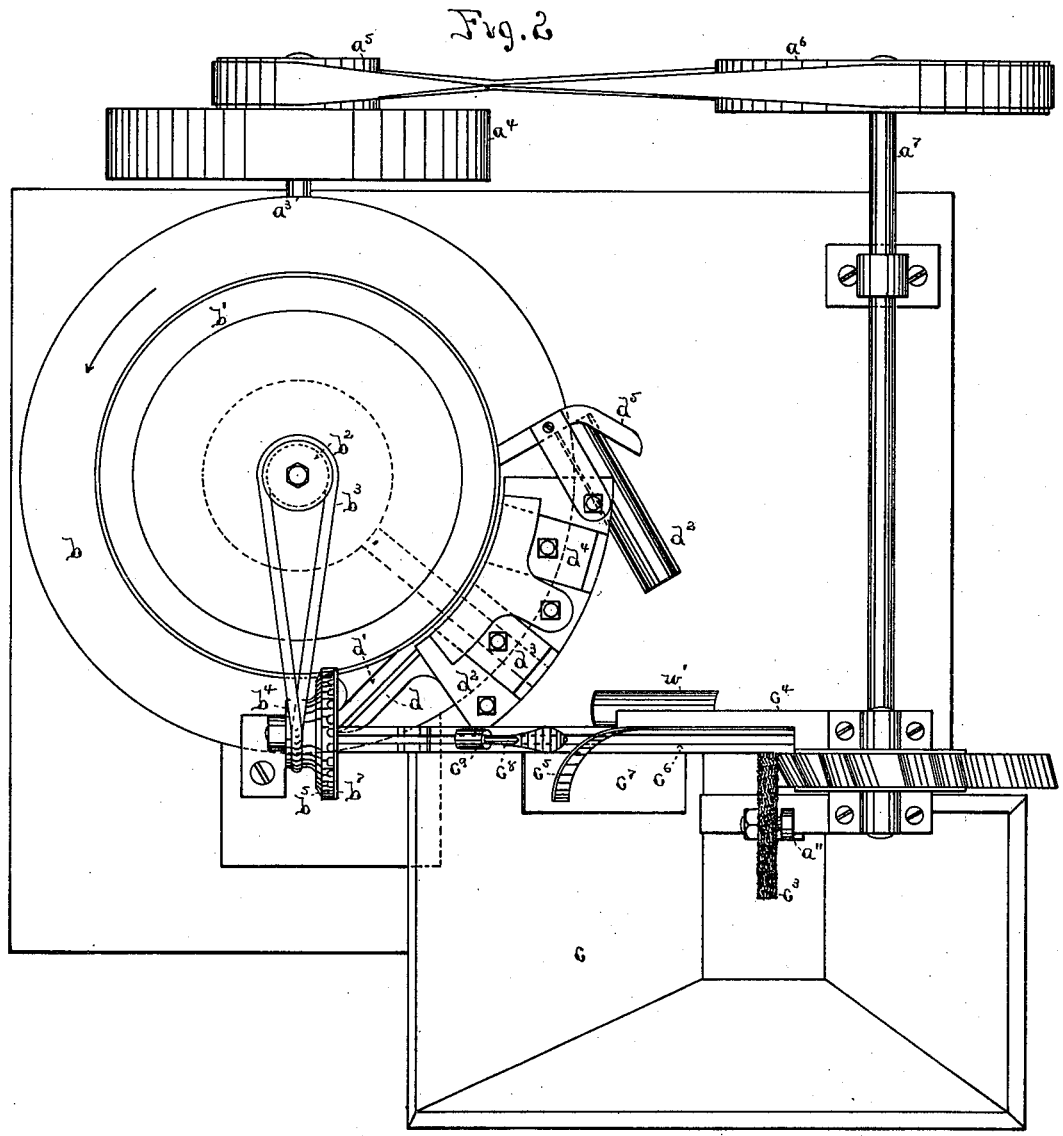
Figure 3:
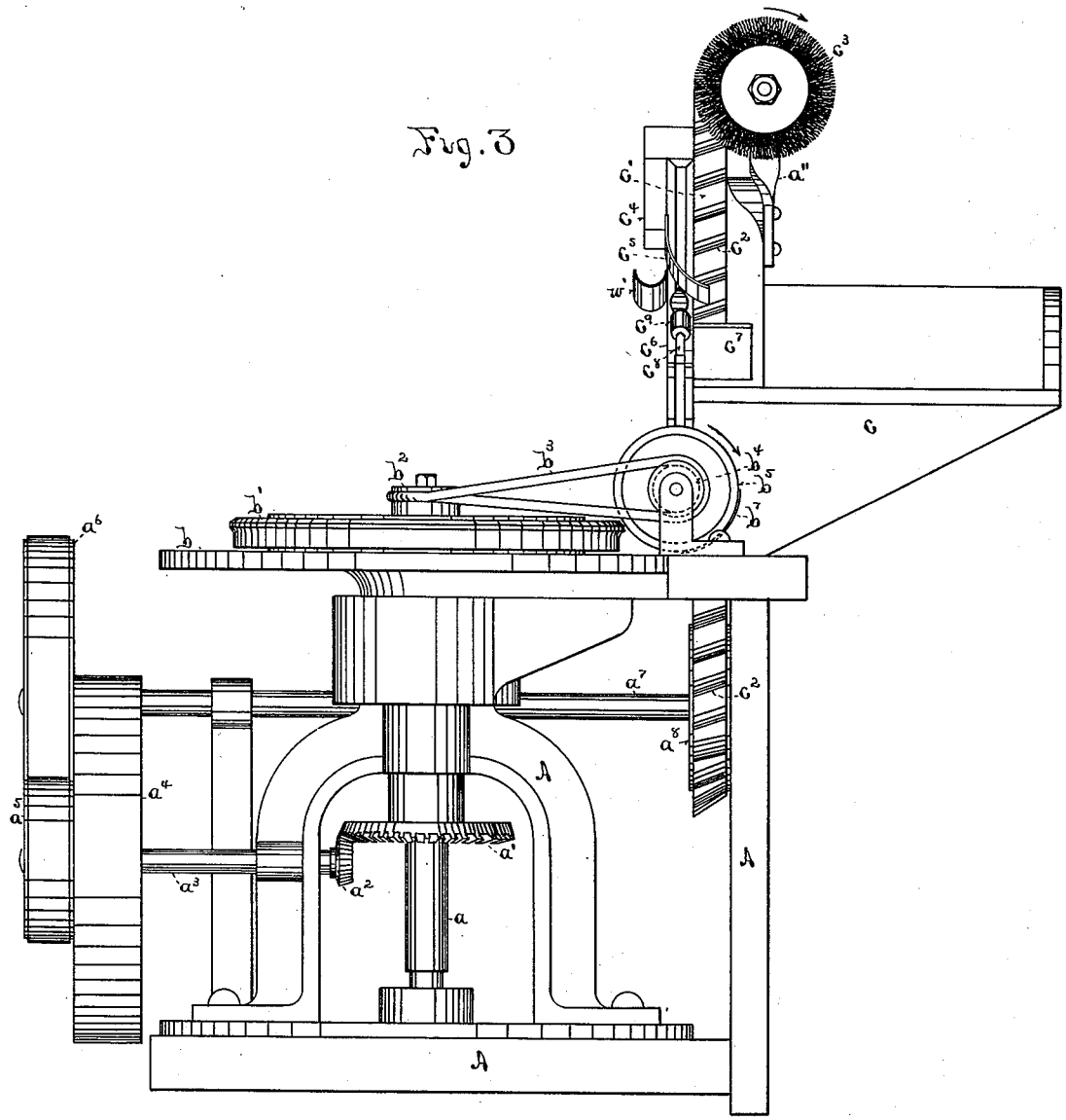
Figure 4:
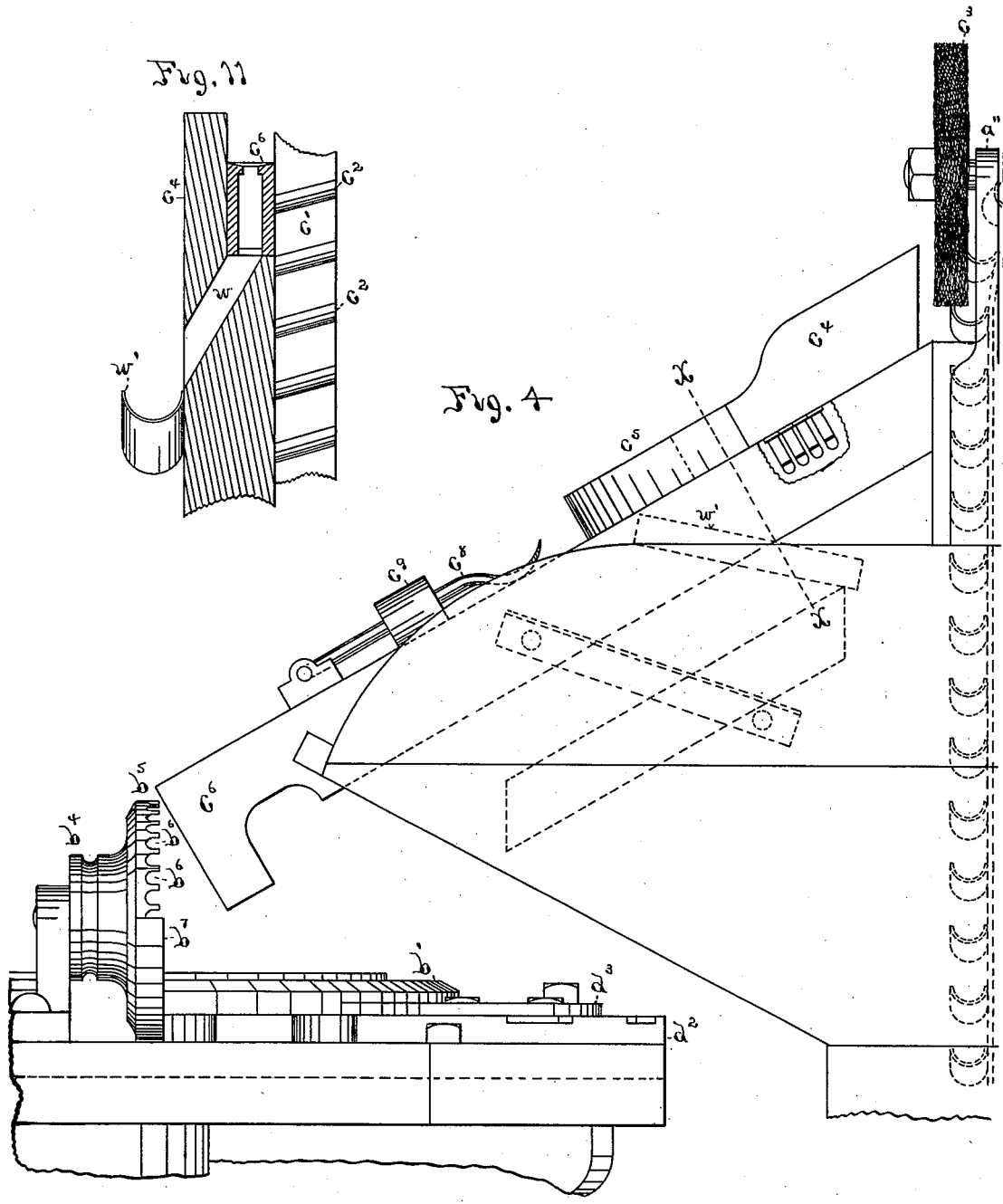
Figure 5:
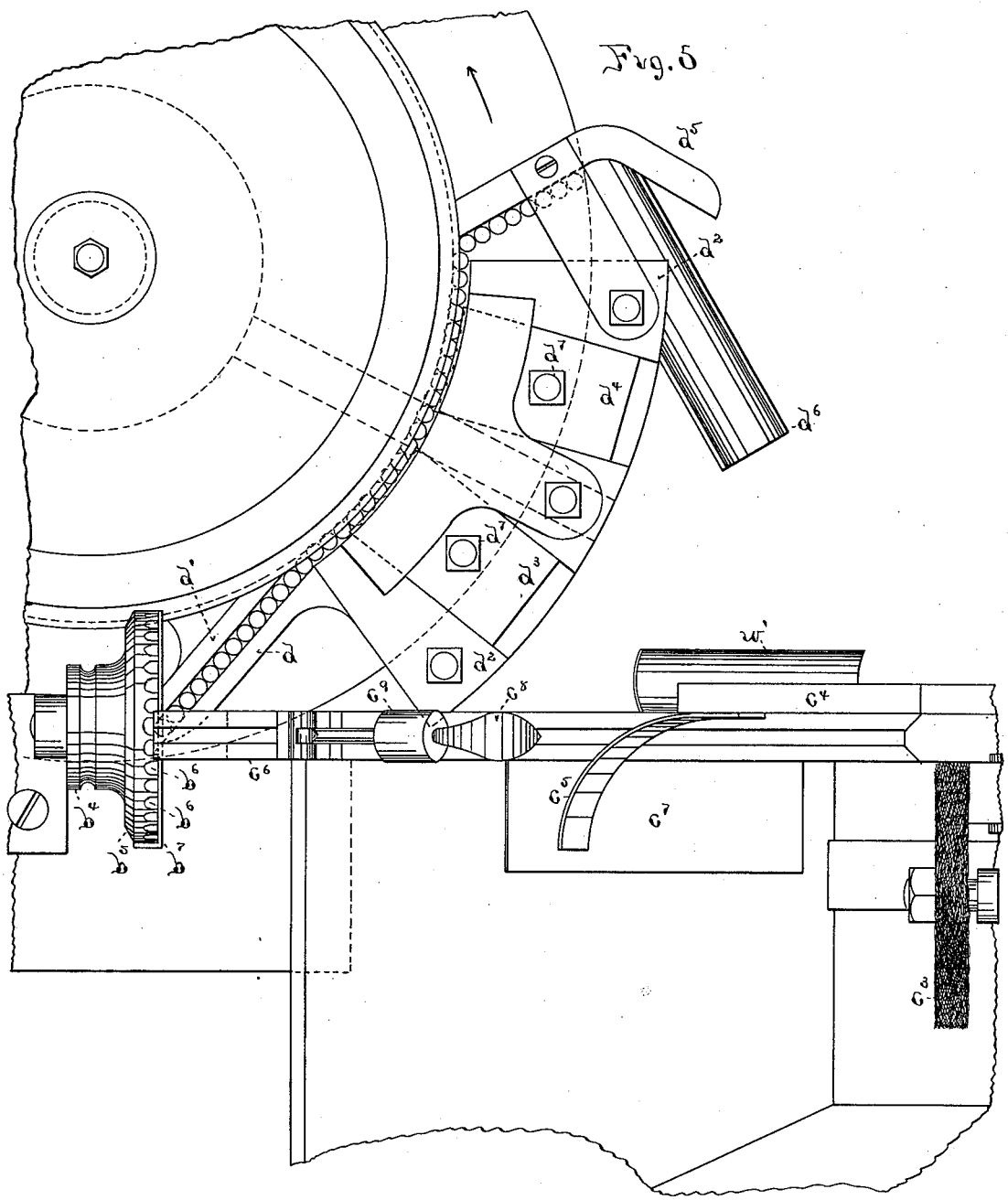
Figure 6:
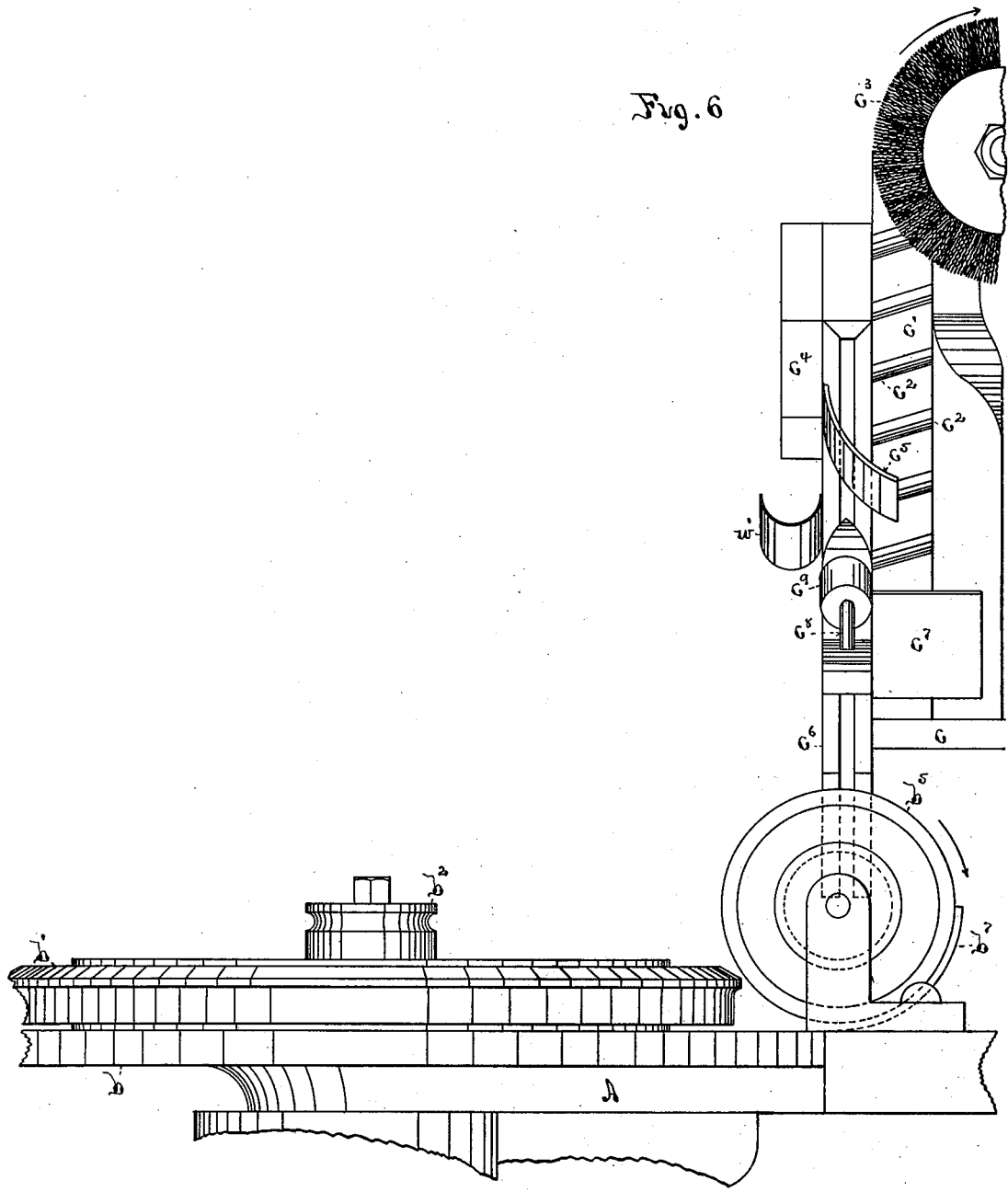

In the drawings: Figure 1 is a side view of a machine for securing the balls in cartridges with my improvements attached thereto. Fig. 2 is a top plan view of the same. Fig. 3 is a side view of the same taken from the left-hand side of Fig. 1 and at right angles to the latter. Fig. 4 is an enlarged view of a portion of Fig. 1. Fig. 5 is an enlarged view of a portion of Fig. 2. Fig. 6 is an enlarged view of a portion of Fig. 3. Fig. 7 is an enlarged view of a portion of the revolving platform and dies shown in Fig. 5, in vertical section. Fig. 8 is a vertical section of same through another of the dies. Fig. 9 shows the cartridge as made up while passing through the die shown in Fig. 7. Fig. 10 shows the cartridge as made up after passing through the die shown in Fig. 8. Fig. 11 is an enlarged view of a portion of Fig. 4, in cross-section.

The particular cartridge machine to which my improvements are shown as attached is one which is used for securing the balls in the cartridge, but their use is not altogether confined to this particular type of cartridge machine, but they may be employed to handle cartridges and present them to other machines used in making the same. Certain of the novel combinations in my feeding devices may also be applied to the feeding of other articles having heads similar to cartridges, as for instance nails, screws, &c., which are fed from a hopper down an inclined chute, in which they hang by their heads.

A is the bed and framework of the machine, which supports the operating parts. A vertical shaft, $a$, is mounted in the framework, resting upon its step at its lower end, and having attached to it a gear $a'$, which engages with a pinion $a^2$ on the shaft $a^3$ projecting beyond the frame of the machine at one end and having mounted thereon the belt pulley $a^4$, which is belted to any suitable counter-shaft. Outside of the pulley, $a^4$, a pulley, $a^5$, is mounted on the shaft $a^3$, which is belted to the pulley $a^6$ upon the shaft, $a^7$, extending across the frame of the machine, near one end, and carrying upon its opposite end the belt wheel $a^8$.

Upon the upper end of shaft $a$ is attached above the frame-work, a table $b$, to which is fixed a revolving disk, $b'$, which travels around with the table. Above the disk $b'$ is attached axially thereto the pulley $b^2$ from which the band $b^3$ leads to the pulley $b^4$, which is attached to the rear face of the wheel or disk $b^5$.

On an upright portion of the frame A is mounted a hopper, $c$, which receives the cartridges in the first instance, they being poured therein loosely. Directly over the pulley $a^8$, and above the hopper $c$, is mounted on the frame-work a pulley wheel $a^9$ which turns freely on its shaft. A belt $c'$ passes around the pulleys $a^8, a^9$, being carried downward outside of the hopper, $c$, on one side by passing around the lazy wheel, $a^{10}$, and being carried upward through the center of the hopper on the other side in a direct line between pulleys $a^8, a^9$, through an aperture in the bottom of the hopper. Buckets $c^2 c^2$ are mounted upon the belt $c'$ so as to be right side up when passing in the upward direction through the hopper. These buckets are secured to the belt $c'$ in a direction slightly inclined toward the vertical wall of the hopper on one side, as shown in Figs. 3 and 6, and are of sufficient size to contain several cartridges. As the belt $c'$ is carried up through the hopper by the rotation of the pulley $a^8$, these buckets each scoop up one or more cartridges from the mass in the hopper and convey them upward to the level of the pulley $a^9$. At this point many of the cartridges slide out of the buckets against the vertical wall $c^4$ and descend as hereinafter described.

Mounted on a stud projecting from the arm $a^{11}$, [the latter being attached to the framework] is a revolving brush $c^3$, so placed that the edges of the buckets $c^2$ impinge against one side of it and cause it to revolve continually, as the buckets pass by it in the direction shown by the arrow in Fig. 3. In so revolving, the brush enters each bucket and brushes out all the cartridges remaining therein, which fall downward against the vertical wall, $c^4$, which terminates in a curved guide $c^5$ at its lower end. Directly below the wall $c^4$ and passing under the curved guide $c^5$ is a strip of wood or metal $c^6$, inclining downward underneath the point where the cartridges fall from the buckets $c^2$, the groove in which strip $c^6$ is of just the proper depth and breadth transversely to receive the body part of the cartridges. As the cartridges drop downward from the buckets $c^2$, a certain proportion of them will descend ball-end foremost into the groove of strip $c^6$, and their heads catching on each side of the groove, they will slide downward therein to the lower end of strip $c^6$. [Fig. 4.] Those cartridges which fall upon the strip $c^6$ from the buckets in such a position as not to enter the groove in it roll downward along its face until they reach the curved guide $c^5$, which deflects them off of the strip $c^6$ and they drop downward onto the inclined platform $c^7$ [Figs. 2 and 3] and fall back into the hopper $c$. The cartridges which slide downward in the groove of strip $c^6$ form a continuous chain or column, and the weight of this at the lower end of the groove would press too heavily upon the lowermost one which there enters the receiver. To avoid this I attach on top of $c^6$ a curved bar $c^8$, by a pivot as shown, and provide it with a sliding weight $c^9$, by sliding which up or down I can cause its curved foot part at the outer end to press more or less upon the heads of the cartridges passing under it. The pressure of this bar $c^8$ is so graduated that the weight of the column of cartridges in the groove of $c^6$ above it will cause them to pass slowly under the bar, and its friction takes off the greater part of the column above it from the part below it. I am thus enabled to present a sufficient length of the groove in the bar $c^6$ to the cartridges falling from the buckets $c^2$ to insure the groove being always kept full of cartridges sliding downward. The face of the wheel $b^5$ revolves opposite the lower end of the grooved strip $c^6$, and a series of semi-cylindrical cavities $b^6$, $b^6$, is made in the face of $b^5$, each of these cavities extending from the periphery radially inward and being of sufficient size to receive the body of a cartridge. As the cartridges slide down the groove of $c^6$ the lowermost one is pressed against the face of the receiving wheel $b^5$ by the weight of the column behind it, and the revolution of the receiving wheel brings the cavities $b^6$, $b^6$, successively opposite the lower end of the groove in $c^6$, thus permitting the lower cartridge to drop into the cavity $b^6$ as it passes the lower end of $c^6$, and transferring the cartridges from $c^6$ to wheel $b^5$ as fast as the cavities of the wheel pass by the groove. As the wheel $b^5$ thus carries the cartridges around with it, they would slide out of the cavities $b^6$ in it, as the wheel went round, but the latter is provided with a shield $b^7$, covering a portion of its periphery below a horizontal line drawn through its axis, and a portion of its face, and the heads of the cartridges passing behind this shield, they are kept in the cavities $b^6$ of the wheel until they are turned head downward by its continued revolution. Upon reaching this position they are brought directly over and upon the rotating table $b$, where the shield $b^7$ terminates. The rotation of the table $b$, being underneath and in a direction away from the face of the receiving wheel $b^5$, serves to carry the cartridge out of its cavity $b^6$ and against a stationary guide $d$, attached to the frame of the machine and extending horizontally over the surface of the rotating table. The guide $d'$ has its outer end projecting behind the cartridges, as they are brought head downward upon the table $b$ by the wheel $b^5$, as before described, and this guide $d'$ is set at such an angle as to assist in carrying the cartridges from the cavities $b^6$ onto rotating table $b$ by the revolution of wheel $b^5$ carrying the cartridges against it. The inner edge of guide $d'$ is placed at such a distance from the opposite edge of guide $d$ as to form a groove between them of just the right size to receive the body parts of the cartridges, as they are caried along by the rotating table $b$, with their heads downward and resting upon it, as shown in Fig. 5. The guide $d'$ is attached to the frame-work of the machine by a curved arm holding it in position.

The cartridges are prepared for the manipulation previously described by having the balls stuck into their shells in the ordinary position, where they remain by the frictional adhesion of the two. When the column of cartridges has been carried past the guide $d'$ by the rotating table $b$, they are brought against the disk $b'$ [rotating with the table] on one side and against a curved piece or plate of metal $d^2$ on the other side, and are rolled along in the space between them until they reach the edge of the groover $d^3$, which is placed at the proper height to crimp the upper end of the cartridge shell into the bullet, as shown in Figs. 7 and 9. This secures the bullet and shell together by a joining which is not waterproof, and after the cartridge has passed the groover $d^3$ it reaches the second groover $d^4$, set somewhat farther above the rotating table $b$, which cuts into the lead of the bullet and turns it over the crimped end of the shell, as shown in Figs. 8 and 10, thus making a water-tight joint. After leaving the groover $d^4$ the cartridges pass onward until they reach the curved stationary guide $d^5$, which deflects them off from table $b$ into the spout $d^6$, whence they drop into any suitable receptacle.

In order to insure the cartridges passing through between the guides, $d$, $d'$, and past the groovers, $d^3$, $d^4$, without crowding or jamming upon each other, which might be dangerous, I cause the receiving wheel $b^5$ to run at a slower rate of speed than the rotating table $b$, which causes the latter to carry away the cartridges from the wheel $b^5$ one by one, and not in a column pressing against each other. By having the rotating table, b, run at a certain predetermined faster rate of speed than the receiving wheel, $b^5$, the guide $d'$ may be omitted because it is evident that its assistance will not be needed in the delivery of the cartridges from the receiving wheel, $b^5$, upon the rotating table and against the guide $d$, and the motion of the rotating table will cause them to travel along the guide, $d$, and be delivered to the crimping dies without the assistance of the guide $d'$, although I prefer to use the latter as I have before described to prevent the cartridges from being accidentally knocked over by the workman while they are traveling along the guide $d$. The groovers $d^3$, $d^4$, are secured to the platform $d^2$ by screw-bolts $d^7$ $d^7$.

The groove in the strip $c^6$ is connected on the dotted line X X of Fig. 4, as shown in Fig. 11, with a passageway $w$ leading from its lower end through the wall $c^4$ to a spout $w'$. If any dirt gets into the groove of strip $c^6$, or one of the bullets comes loosened from its shell, the dirt or bullet and powder falls down through the passageway and are carried off by the spout $w'$, thus preventing the groove in strip $c^6$ from becoming clogged.

It will be observed that the combination of the grooved inclined strip and the receiving wheel $b^5$, whereby the cartridges are turned with the ball or heavy end upward and deposited upon the table beneath with the head or light end downward, is one of the chief features of novelty in my invention, and that various methods may be adopted to introduce the cartridges into the groove of the inclined strip $c^6$ and to remove them or carry them away from the receiving wheel $b^5$, without varying the operation of the wheel and the grooved strip together as described. It is also obvious that other means than the shield $b^7$ may be employed for keeping the cartridges in the cavities $b^6$ of wheel $b^5$ while they are being inverted, without materially varying the latter operation.

What I claim as new and of my invention is—

1. The combination of the inclined grooved strip $c^6$, adapted to receive the cartridges and allow them to slide downward therein, and the receiving rotating wheel $b^5$ having its radial face brought adjacent to the lower end of strip $c^6$ and provided with one or more cavities $b^6$, adapted to receive the cartridges from the grooved strip in passing the same, substantially as described.

2. The combination of the grooved strip $c^6$ adapted to receive and convey the cartridges downward therein, the wheel $b^5$ having its radial face revolved past the lower end of said strip and provided with one or more cavities $b^6$ adapted to receive the cartridges therefrom, and the shield $b^7$ arranged opposite to the face and edge of wheel $b^5$ to retain the cartridges in said cavities, substantially as described.

3. The combination of the grooved strip $c^6$ adapted to receive and convey the cartridges downward therein, the pivoted presser bar $c^8$ arranged to press upon the cartridges in the grooved strip and the receiving wheel $b^5$ provided with one or more cavities $b^6$ adapted to receive the cartridges from the grooved strip in passing the same, substantially as described.

4. The combination of the inclined grooved strip $c^6$ adapted to receive the cartridges and allow them to slide downward therein, and the receiving wheel $b^5$ having its face brought adjacent to the lower end of said strip and provided with one or more cavities $b^6$ adapted to receive the cartridges from the grooved strip in passing the same, with the revolving table $b$, arranged to receive the cartridges from the wheel $b^5$ substantially as described.

5. The combination of the grooved strip $c^6$ adapted to receive the cartridges and allow them to slide downward therein, the receiving rotating wheel $b^5$ located at the lower end thereof and provided with one or more cavities $b^6$ adapted to receive the cartridges from the grooved strip, the rotating table $b$, and the stationary guide $d$, the rotating table being arranged to revolve at a faster speed than the receiving rotating wheel substantially as described.

6. The combination of the grooved strip $c^6$ adapted to receive the cartridges and allow them to slide downward therein, the receiving wheel $b^5$ located at the lower end thereof and provided with one or more cavities $b^6$ adapted to receive the cartridges from said grooved strip in passing the same, the rotating table $b$ and the guides $d$ and $d'$, substantially as described.

7. The combination of the hopper $c$, the elevating feed belt, $c'$, leading upward through the bottom of the hopper and provided with one or more buckets $c^2$, and the inclined grooved feeding chute $c^6$ having its upper part located adjacent to the path of the buckets and in position to receive the articles dropping therefrom, and to allow them to slide downward therein, substantially as described.

8. The combination of the hopper $c$, elevating belt $c'$ passing through the hopper provided with one or more buckets $c^2$, the grooved strip $c^6$ adapted to receive the cartridges and allow the same to slide downward therein, and the receiving wheel $b^5$ having its face revolved past the lower end of said strip and provided with one or more cavities $b^6$ adapted to receive the cartridges therefrom, and turn them the other end upward by its rotation substantially as described.

9. The combination of the hopper $c$, elevating belt $c'$ provided with one or more buckets, $c^2$, and passing through the hopper, the brush $c^3$ arranged to brush the articles out of said buckets as they pass it, and the inclined grooved strip $c^6$ located to receive them as they fall from the buckets, and to allow them to slide downward therein, substantially as described.

10. The combination of the hopper $c$, the elevating belt $c'$ passing through the hopper, provided with one or more buckets $c^2$, the brush $c^3$ arranged to brush the articles out of said buckets as they pass it, the inclined grooved strip $c^6$ located to receive them as they fall from the buckets and to allow them to slide downward therein, and the curved guide or deflector $c^5$ arranged above said grooved strip, substantially as described.

11. The combination of the rotating disk $b'$, having a smooth bearing periphery the curved plate $d^2$ provided with two groovers $d^3$, $d^4$, placed at different heights opposite the edge of the disk and adapted to crimp the edge of the shell into the bullet and turn the lead of the bullet over the seam between it and the shell, and the bed or table $b$ extending underneath the shell, substantially as described.

PAUL BUTLER.

Witnesses:
N. P. OCKINGTON,
DAVID HALL RICE.